United States Patent [19]

Garbis et al.

[11] 4,394,828
[45] Jul. 26, 1983

[54] SHIELDED/JACKETED RIBBON-CABLE SHEATHING STRIPPING TOOL

[76] Inventors: Dennis J. Garbis, P.O. Box 1555, Santa Ana, Calif. 92702; Donald E. Baker, 11314 212th St., Lakewood, Calif. 90715

[21] Appl. No.: 254,154
[22] Filed: Apr. 14, 1981
[51] Int. Cl.³ .............................................. H02G 1/12
[52] U.S. Cl. ..................... 81/9.51; 30/90.8; 29/566.1
[58] Field of Search ................. 81/9.5 R, 9.5 C, 9.51; 30/90.4, 90.8; 83/DIG. 1; 29/33.52, 566.1

[56] References Cited

U.S. PATENT DOCUMENTS

| | | | |
|---|---|---|---|
| 2,098,123 | 11/1937 | Wood | 30/90.4 X |
| 2,721,384 | 10/1955 | Bell | 81/9.5 R |
| 3,109,332 | 11/1963 | Rando | 81/9.5 R |
| 3,543,616 | 12/1970 | Bradley | 81/9.5 R |
| 3,706,241 | 12/1972 | Balmer et al. | 81/9.51 |
| 3,851,425 | 12/1974 | Lang | 81/9.51 X |
| 4,046,298 | 9/1977 | Schroeder, Jr. | 81/9.51 X |
| 4,081,871 | 4/1978 | Knuth | 81/9.5 B X |
| 4,120,217 | 10/1978 | Rodd et al. | 81/9.51 |

FOREIGN PATENT DOCUMENTS

| | | | |
|---|---|---|---|
| 1079148 | 4/1960 | Fed. Rep. of Germany | 81/9.5 C |
| 2158888 | 4/1973 | Fed. Rep. of Germany | 81/9.5 R |

Primary Examiner—Harold D. Whitehead
Assistant Examiner—Robert P. Olszewski
Attorney, Agent, or Firm—Amster, Rothstein & Engelberg

[57] ABSTRACT

A cable stripping tool for the stripping of sheathing from multi-conductor ribbon cable of various widths includes a blade mounted for the simultaneous slitting of the two longitudinal edges of the cable sheathing without damage to the enclosed conductors. A guide element projects forward from the blade to direct the blade into the cable between the sheathing and the enclosed conductors. In a particular embodiment, the blade has two cutting edges mounted at a 60 degree angle to each other to provide a self-aligning feature.

3 Claims, 6 Drawing Figures

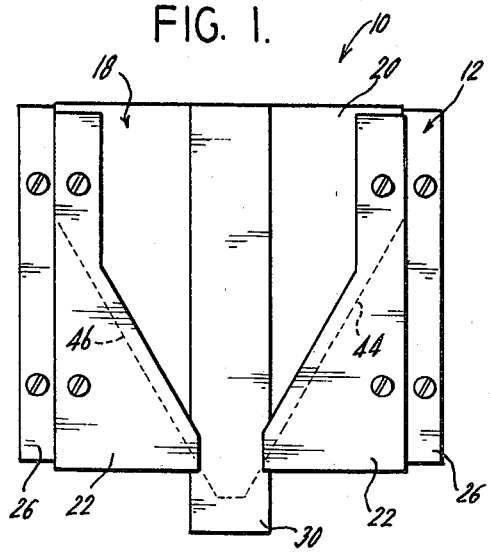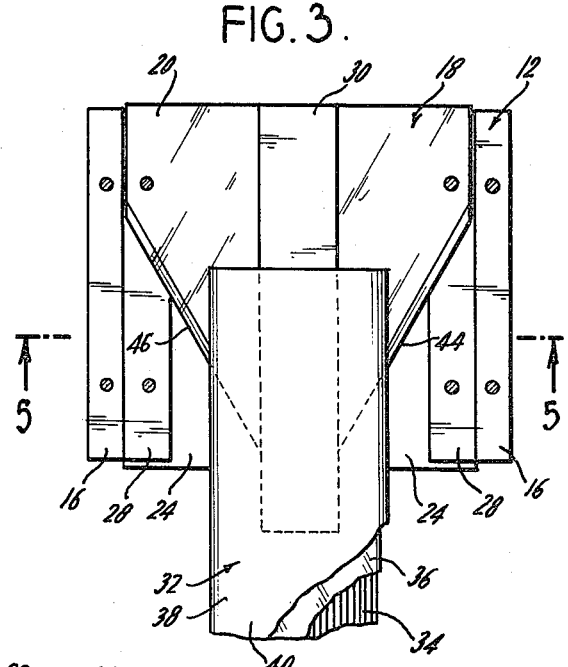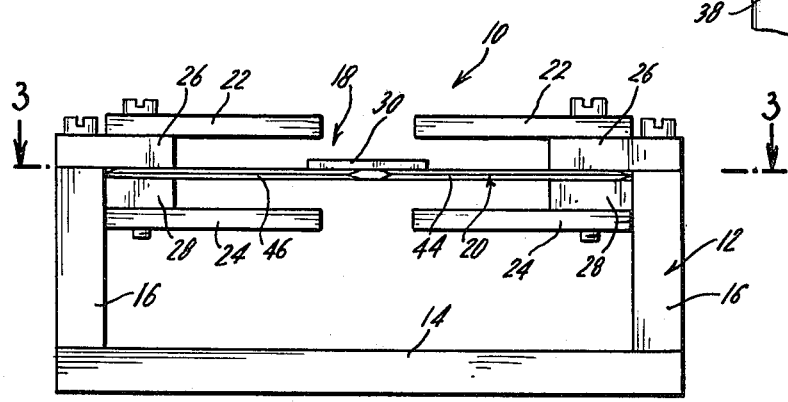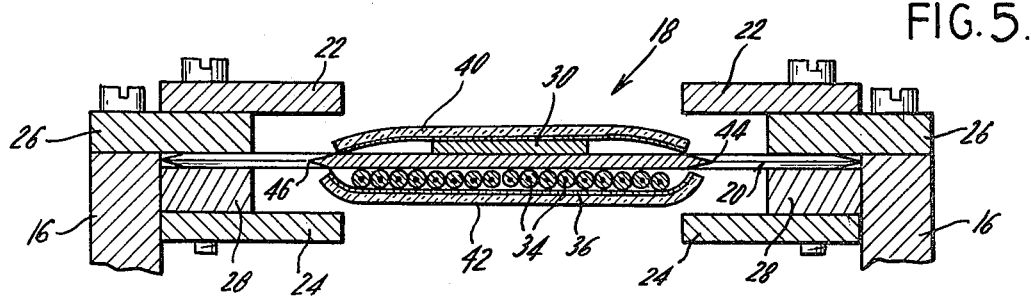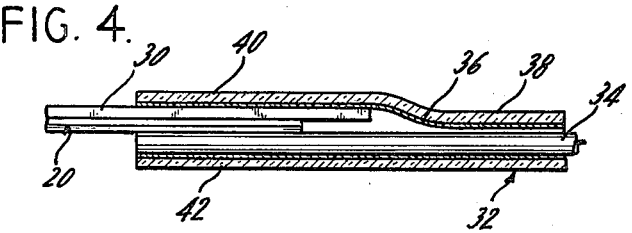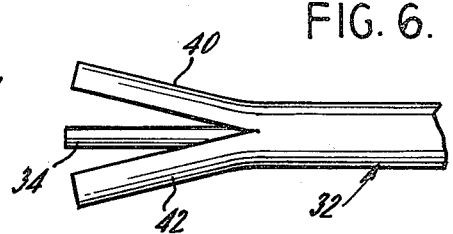

SHIELDED/JACKETED RIBBON-CABLE SHEATHING STRIPPING TOOL

BACKGROUND OF THE INVENTION

This invention relates to a cable stripping tool and, in particular, to an improved tool for the removal of sheathing from multiple conductor ribbon cables.

Multiconductor ribbon cables, in which the individual conductor elements are aligned in a parallel relationship along a plane, are often utilized in electronic equipment when it is necessary to create a plurality of independent electrical signal paths between two locations within the equipment. In such ribbon cables each individual conductor element is individually insulated, and the group of individually insulated conductors are surrounded by an electromagnetic shielding sheath and an insulating sheath which defines the cable proper. In order to utilize such ribbon cables in the equipment it is necessary to remove a section of the electromagnetic shielding sheath and insulating sheath to provide access to the ends of the individual conductor elements.

Numerous methods and apparatus have been utilized to strip such sheaths from ribbon cable. For example, U.S. Pat. No. 4,081,871 of Apr. 4, 1978 to Knuth discloses an electrician's wire stripping tool, which includes a blade which may be drawn over the ribbon cable to remove the insulating sheath and expose the individual conductors. The conductors must then be separated from the other side of the insulating sheath. U.S. Pat. No. 4,120,217 of Oct. 17, 1978 to Rodd et al., discloses a method and apparatus in which the insulating sheath is slit along its length between the edge portions of the sheath and the outermost conductors. Simultaneous with such slitting, the cable is slit across the edge portions of the insulation and through one side of the insulation between the edge portions.

This prior art, which is illustrative of prior art in general, suffers from one or more disadvantages, such as an inability to adapt to ribbon cables of various widths, an inability to readily compensate for different thicknesses of insulation; the inability to strip electromagnetic shielding sheaths; the need for precise positioning; or the need for relatively complex, power-driven parts. There thus is a need for a ribbon cable stripping apparatus which is inexpensive, hand operable, fully adjustable to a wide range of cable widths, and which can effectively strip both insulating jacketing and electromagnetic shielding sheaths from the ribbon cable.

SUMMARY OF THE INVENTION

It is, therefore, an object of the present invention to provide a ribbon cable sheathing stripping tool which may be hand operated.

It is a further object of the present invention to provide a ribbon cable sheathing stripping tool which may be used on a wide variety of ribbon cables of varying widths.

It is yet a further object of the present invention to provide a ribbon cable stripping tool which can strip both shielded and unshielded ribbon cables.

It is yet a further object of the present invention to provide such features and advantages in a tool which is portable, easy to operate and simple and efficient to manufacture.

In accordance with one embodiment of the present invention, there is provided a ribbon cable sheathing stripping tool having a longitudinal blade positioned between upper and lower blade protection members. Lying upon the blade and projecting forward therefrom is a stiffening and guide member which directs the blade into the end of the ribbon cable between the individual conductor elements and the electromagnetic shielding sheath. The blade has cutting edges which automatically center the cable in the apparatus and which slit the sides of the electromagnetic shielding sheath and insulating sheath as the cable is pushed into the device. After slitting for the desired length, the cable is removed from the device. The slit electromagnetic sheath and insulating sheath may easily be cut away to fully expose the individual conductor elements.

The above brief description, as well as further objects, features and advantages of the present invention will become apparent and more fully understood from the following detailed description of a presently preferred, but nonetheless illustrative embodiment of the present invention when read in connection with the attached drawings, wherein:

FIG. 1 is a top plan view of the ribbon cable sheathing stripping tool of the present invention;

FIG. 2 is a front elevation view of the invention;

FIG. 3 is a sectional view taken along line 3—3 of FIG. 2 wherein the upper blade protection members are removed, showing a section of ribbon cable in the process of being stripped;

FIG. 4 is a sectional elevation view of a section of ribbon cable being slit by the present invention;

FIG. 5 is an sectional view taken along line 5—5 of FIG. 3 wherein the upper blade protection members are shown in position; and FIG. 6 is an elevation view of a section of ribbon cable after being slit by the present invention.

Referring initially to FIGS. 1 and 2, ribbon cable sheathing stripping tool 10 has frame 12 including base portion 14 and uprights 16 supporting cutting assembly 18. Cutting assembly 18 includes blade 20 which is positioned between upper blade protection members 22 and lower blade protection members 24 by upper spacer elements 26 and lower spacer elements 28, respectively. Mounted upon blade 20 is guide 30 which projects beyond the front of the blade.

Referring now to FIGS. 3 and 5, ribbon cable 32 has individual insulated conductors 34 surrounded by electromagnetic shielding sheath 36 and insulating sheath 38. Both the electromagnetic shielding sheath 36 and the insulating sheath 38 have upper and lower essentially parallel sides 40 and 42 joined at their longitudinal edges. The ribbon cable is introduced into the slitting tool by inserting guide 30 between conductive sheath 36 and conductors 34. The ribbon cable is then pushed further into the tool such that cutting edges 44 and 46 slit both shielding sheath 36 and insulating sheath 38 along the longitudinal edges of the cable. The cable is continued to be inserted such that the edges of the cable are slit for the desired distance. The cable is then pulled back and removed from the tool. The cable then has the configuration of FIG. 6 in which both the longitudinal edges of both the electromagnetic shielding sheath and insulating sheath have been slit, while the individual conductors remain intact. It is then a simple task to make a transverse cut across the electromagnetic shielding sheath and insulating sheath to remove the split sections of sheath.

Cutting edges 44 and 46 of blade 20 preferably form a 60 degree angle with each other. With this configuration, the tool becomes essentially self-aligning, such that the ribbon cable inserted into the tool remains centered in the tool during the slitting operation. Using such an angled blade, the width of the tool can be great enough to accommodate a variety of widths of cable, since the cable to be slit is always aligned in the center of the tool.

A tool of the present invention has been found suitable for slitting ribbon cables having from 24 to 60 conductors. In such an embodiment, blade 20 may be of hardened steel, 0.025 inches in thickness and having a width of five inches. Guide 30 may also be of hardened steel, 0.025 inches in thickness, welded or otherwise fastened to the blade. In such a configuration, upper blade protection member spacers 26 and lower blade protection member spacers 28 may be 0.120 inches in thickness. The remaining portions of the tool may similarly be constructed of steel.

In use, the stripping tool may be permanently or temporarily mounted upon any appropriate surface by clamps, screws or the like, or may alternatively be hand held, since blade protection members 22 and lower blade protection members 24, along with guide 30, protect the operator from inadvertent contact with blade 20. It is to be appreciated that the present invention may be utilized with both shielded and unshielded ribbon cables, and can be used to strip ribbon cables having a series of concentric sheath layers.

Thus, in accordance with the present invention there has been described a ribbon cable insulation slitting tool having a blade dimensioned to simultaneously cut opposite edges of the ribbon cable sheathing. The blade has a guide mounted thereon and projecting forward from the blade to direct the blade between the sheathing and the individual conductors such that as the cable is inserted into the tool, the edges of the cable are slit without damage to the enclosed conductors. By providing two cutting edges disposed at a 60 degree angle to each other, the tool is self-aligning so that a single tool can be utilized for the stripping of ribbon cables of various widths.

Although the invention herein has been described with reference to a particular embodiment, it is to be understood that this embodiment is merely illustrative of the principles and application of the invention. It is to be appreciated that numerous modifications may be made in the illustrative embodiment and other arrangements may be devised without departing from the spirit and scope of the present invention.

We claim:

1. A tool for use in stripping sheathing from a ribbon cable of the type characterized by a series of parallel conductors lying in a plane encased in one or more layers of sheathing having first and second opposite sides essentially parallel to the plane of the conductors connected along their longitudinal edges comprising a frame having at least two spaced-apart upright supports adapted to be mounted on a horizontal surface and when mounted, extending generally at right angles thereto, and a cutting assembly supported by said upright supports at a predetermined position above the horizontal surface, said cutter assembly including a cutting blade having a forward end, a central axis and at least two cutting edges in the plane of said blade extending rearwardly and at an angle to said central axis with the central axis being an axis of symmetry for said cutting blade, said blade being secured to said upright supports in a position generally parallel to the horizontal surface, and a non-cutting guide member mounted on a surface of said blade symmetrical with the central axis thereof and having a leading edge extending forwardly of the forward end of said blade, said guide member adapted to be inserted between the conductor sheath and conductors of said ribbon cable to separate the same prior to the cable contacting the cutting edges as the cable is pushed rearwardly to slit said sheath while permitting the enclosed conductors to pass therethrough undamaged.

2. The tool of claim 1 wherein the blade includes two cutting edges disposed at a 60 degree angle from each other.

3. The tool of claim 1 or claim 2 further including upper and lower blade protection elements mounted with respect to and spaced from the blade to protect the blade from inadvertent operator contact.

* * * * *